US012316500B2

(12) United States Patent
Gourlay et al.

(10) Patent No.: US 12,316,500 B2
(45) Date of Patent: May 27, 2025

(54) METHOD AND SYSTEM FOR NETWORK TOPOLOGY ENFORCEMENT

(71) Applicant: Arista Networks, Inc., Santa Clara, CA (US)

(72) Inventors: Douglas Alan Gourlay, San Francisco, CA (US); Andre Henri Joseph Pech, San Francisco, CA (US); Benoit Sigoure, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 16 days.

(21) Appl. No.: 17/714,956

(22) Filed: Apr. 6, 2022

(65) Prior Publication Data
US 2022/0231918 A1 Jul. 21, 2022

Related U.S. Application Data

(63) Continuation of application No. 15/867,282, filed on Jan. 10, 2018, now Pat. No. 11,329,881, which is a continuation of application No. 14/225,886, filed on Mar. 26, 2014, now Pat. No. 9,900,217.

(51) Int. Cl.
*H04L 41/0873* (2022.01)
*H04L 41/0893* (2022.01)
*H04L 41/0894* (2022.01)
*H04L 41/12* (2022.01)

(52) U.S. Cl.
CPC ...... *H04L 41/0873* (2013.01); *H04L 41/0893* (2013.01); *H04L 41/0894* (2022.05); *H04L 41/12* (2013.01); *Y02B 70/30* (2013.01); *Y02D 30/00* (2018.01)

(58) Field of Classification Search
None
See application file for complete search history.

(56) References Cited

U.S. PATENT DOCUMENTS

| 7,099,580 | B1 * | 8/2006 | Bulbul | H04L 41/12 398/58 |
| 8,144,627 | B2 * | 3/2012 | Uppalli | H04L 41/12 370/254 |
| 8,406,128 | B1 | 3/2013 | Brar et al. | |
| 8,532,086 | B1 | 9/2013 | Genetti et al. | |
| 8,949,949 | B1 * | 2/2015 | Sella | H04W 12/041 726/21 |
| 2006/0203788 | A1 * | 9/2006 | Cheon | H04L 45/02 455/401 |

(Continued)

*Primary Examiner* — Ayman A Abaza
*Assistant Examiner* — Camquyen Thai
(74) *Attorney, Agent, or Firm* — Fountainhead Law Group, PC

(57) ABSTRACT

A method and system for enforcing network topology. The method includes receiving, at a first port on a first switch, a second role associated with a second switch, where the second switch is connected to the first switch using the first port, and where the first switch is associated with a first role. The method further includes making a first determination, using the first role, the second role, and a network topology policy, that the first switch should not be connected to the second switch. Sending, in response to the first determination, a first alert to an alert recipient, where the first alert specifies that the first switch is improperly connected to the second switch.

21 Claims, 9 Drawing Sheets

(56) References Cited

U.S. PATENT DOCUMENTS

| | | | |
|---|---|---|---|
| 2007/0242602 A1* | 10/2007 | Pang | H04L 45/02 370/254 |
| 2009/0089462 A1 | 4/2009 | Strutt | |
| 2010/0214940 A1 | 8/2010 | Macauley | |
| 2010/0232317 A1* | 9/2010 | Jing | H04L 41/12 370/254 |
| 2013/0077473 A1 | 3/2013 | Ojha et al. | |
| 2013/0156425 A1* | 6/2013 | Kirkpatrick | H04B 10/801 398/45 |
| 2013/0286817 A1 | 10/2013 | Allan | |
| 2014/0050116 A1* | 2/2014 | Yang | H04L 12/462 370/254 |
| 2014/0105029 A1* | 4/2014 | Jain | H04L 43/0811 370/242 |
| 2014/0177640 A1* | 6/2014 | Yang | H04L 12/462 370/401 |
| 2014/0181292 A1* | 6/2014 | Venkataswami | H04L 45/04 709/224 |
| 2014/0241205 A1 | 8/2014 | Virk et al. | |
| 2014/0307588 A1 | 10/2014 | Kim et al. | |
| 2014/0369345 A1* | 12/2014 | Yang | H04L 12/1886 370/392 |
| 2015/0016277 A1 | 1/2015 | Smith et al. | |
| 2015/0188808 A1* | 7/2015 | Ghanwani | H04L 47/15 709/244 |

* cited by examiner

METHOD AND SYSTEM FOR NETWORK TOPOLOGY ENFORCEMENT

CROSS-REFERENCE TO RELATED APPLICATIONS

This application is a continuation application of U.S. patent application Ser. No. 15/867,282, filed on Jan. 10, 2018 and titled: "Method and System for Network Topology Enforcement." Accordingly, this application claims benefit of U.S. patent application Ser. No. 14/225,886 under 35 U.S.C. § 120. U.S. patent application Ser. No. 15/867,282 is a continuation application of U.S. patent application Ser. No. 14/225,886, filed on Mar. 26, 2014 and entitled: "Method and System for Network Topology Enforcement." Accordingly, this application claims benefit of U.S. patent application Ser. No. 14/225,886 under 35 U.S.C. § 120. U.S. patent application Ser. No. 14/225,886 and U.S. patent application Ser. No. 15/867,282 are hereby incorporated by reference in their entirety.

BACKGROUND

Unlike other networks, such as a wide area network and a campus network, data centers have an inherent rigid structure. When a data center is deployed, it is common for it to include a large number of network devices, each of which must be properly configured to allow the data center to function as intended. This may be accomplished by accessing each network device and performing a series of configuration steps that enable the network device to perform its specific intended function in the data center. This process typically includes a number of manual steps which are time consuming and error prone and become more so as the size of the data center increases. Additionally, the network devices must also be properly connected (e.g. wired) to both each other. and to other components in the data center that require network connectivity. The process of connecting all the network devices and components in a data center is a manual one and prone to errors. Errors in the network device configuration and connections lead to network devices and other data center components being incorrectly configured, unconnected, or incorrectly connected to the data center's network infrastructure. This leads to the data center not functioning as intended. Further, such errors can be costly to identify and repair.

SUMMARY

In general, in one aspect, the invention relates to a non-transitory computer readable medium comprising instructions, which when executed by a processor perform a method, the method comprising receiving, at a first port on a first switch, a second role associated with a second switch, wherein the second switch is connected to the first switch using the first port, wherein the first switch is associated with a first role, making a first determination, using the first role, the second role, and a network topology policy, that the first switch should not be connected to the second switch, and sending, in response to the first determination, a first alert to an alert recipient, wherein the first alert specifies that the first switch is improperly connected to the second switch.

In general, in one aspect, the invention relates to a non-transitory computer readable medium comprising instructions, which when executed by a processor perform a method, the method comprising receiving, by a switch, a discovery protocol data unit (DPDU) from each of a plurality of switches directly connected to the switch, wherein each of the DPDUs specifies a role for the one of the plurality of switches that issued the DPDU, determining, using the roles associated with the plurality of switches and a network topology policy, that the switch is connected to an improper number of switches of the plurality of switches, wherein each of the number of switches is associated with a particular role, and sending, in response to a determination, an alert to an alert recipient, wherein the alert specifies that the switch is improperly connected to one selected from a group consisting of an excess number of switches associated with the particular role and a deficient number of switches associated with the particular role.

In general, in one aspect, the invention relates to a switch, the switch comprising a plurality of ports, a processor, and memory comprising instructions, which when executed by the processor, enable the switch to perform a method, the method comprising: receiving, at a first port of the plurality of ports, a second role associated with a second switch, wherein the second switch is connected to the switch using the first port, wherein the switch is associated with a first role, making a first determination, using the first role, the second role, and a network topology policy, that the switch should not be connected to the second switch, and sending, in response to the first determination, a first alert to an alert recipient, wherein the first alert specifies that the switch is improperly connected to the second switch.

Other aspects of the invention will be apparent from the following description and the appended claims.

DETAILED DESCRIPTION

Figure 1:
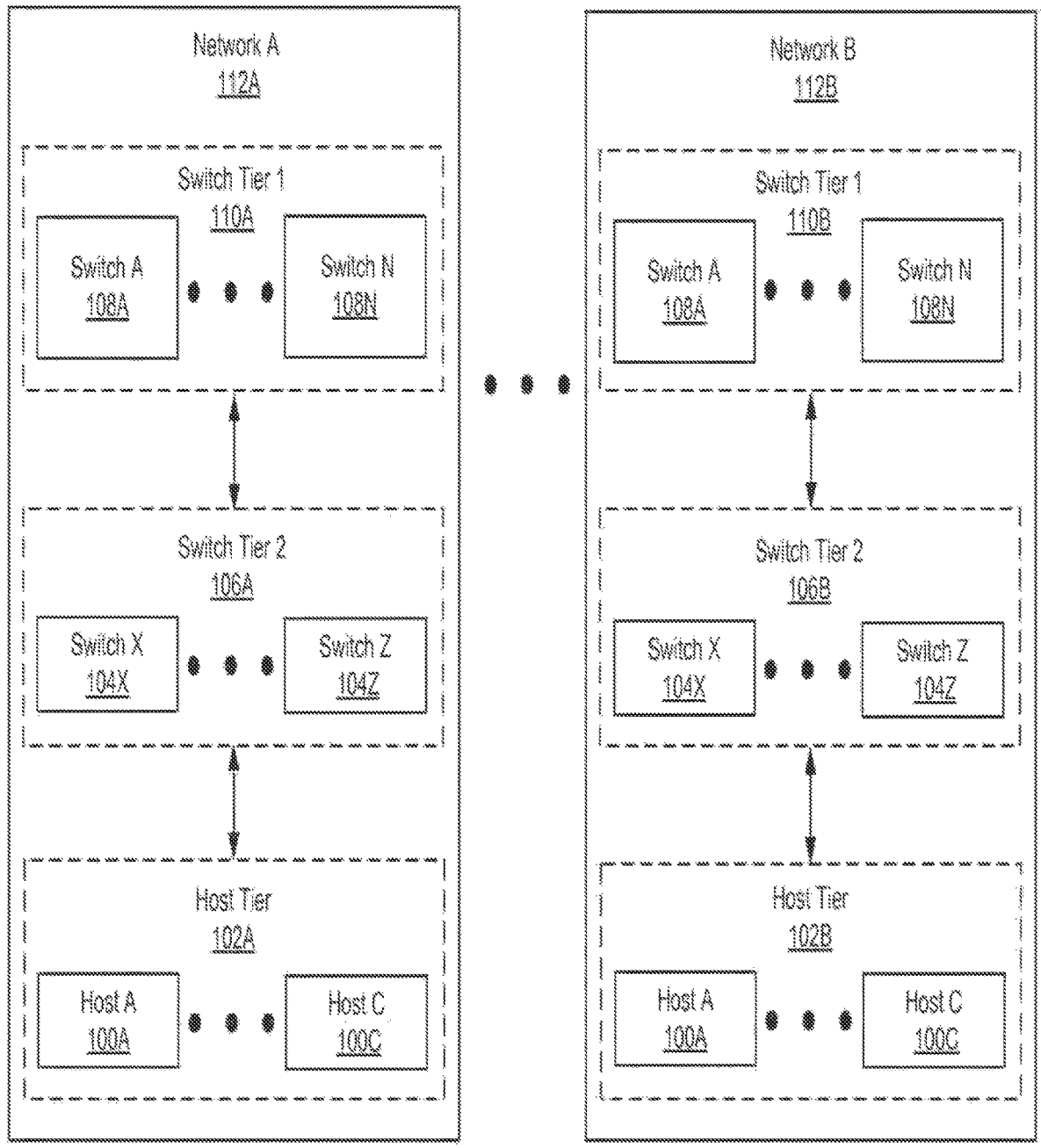
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for enforcing network topology. More specifically, one or more embodiments of the invention enable a user (e.g., a network administrator) to automate (or substantially automate) the verification of the connections of a newly deployed switch or a replacement switch to other switches in the network infrastructure using a network topology policy and neighbor information as determined by a discovery protocol. In one or more embodiments of the invention, the discovery protocol may correspond to link layer discovery protocol (LLDP), Cisco discovery protocol (CDP), or any other layer 2 discovery protocol that enables a network to determine their neighbors (i.e., other network device to which they are directly connected) and that permits the transfer of other information used to implement one or more embodiments of the invention (e.g., role, network ID, etc.).

The following description describes embodiments of the invention in which a switch detects it has improper or missing connections to other switches in the network infrastructure as determined by a network topology policy and LLDP information described below. However, the invention is not limited to switches; rather, embodiments of the invention may be extended to enable verification of network topology for other network devices, such as routers, provided that such network devices are able to obtain LLDP information (described below). Also, embodiments of the invention are not limited to network devices that are being initially deployed; rather embodiments of the invention may be extended to network devices that are being used to replace existing network devices, as in the case of a network device failure or a network device hardware upgrade. Also, embodiments of the invention are not limited to network devices in a data center; rather embodiments of the invention may be extended to environments other than a data center in which network devices require configuration.

FIG. 1 shows a system in accordance with one or more embodiments of the invention. In one embodiment of the invention, the system is a data center that includes one or more networks (112A-112B), switch tier 1 (110A, 110B), switch tier 2 (106A, 106B) and a host tier (102A, 102B). Switch tier 1 may include one or more switches (108A-108N) with a role of a spine switch, switch tier 2 may include one or more switches (104X-104Z) with a role of a leaf switch and the host tier may include one or more hosts (100A-100C). One skilled in the art will recognize that the number of networks, switches with a role of a spine switch, switches with a role of a leaf switch, and hosts in a data center may vary depending on the requirements that the data center is designed to meet without departing from the invention.

In one embodiment of the invention, switch tier 2 (106A, 106B) includes switches that connect to hosts in a network (112A, 112B) in a data center and switch tier 1 (110A, 110B) includes switches that connect to the switches in switch tier 2. A switch is a physical device that includes persistent storage, memory (e.g., Random Access Memory), one or more processors, and two or more physical ports. Each port may or may not be connected to another device on a network (e.g., a host, a switch, a router, etc.). Each switch with role of a spine switch (108A-108N) and each switch with role of a leaf switch (104X-104Z) is configured to receive packets via the ports and determine whether to (i) drop the packet, (ii) process the packet in accordance with one or more embodiments of the invention, and/or (iii) send the packet out another port on the network device. How the switch makes the determination of whether to drop the packet or send the packet to another device on the network depends, in part, on whether the switch is a layer-2 (L2) switch or a layer-3 (L3) switch (also referred to as a multilayer switch). If the switch is operating as a L2 switch, the switch uses the destination media access control (MAC) address along with a forwarding table to determine out of which port to send the packet. If the switch is operating as a L3 switch, the switch uses the destination Internet protocol (IP) address along with a routing table to determine out of which port to send the packet. If the switch is a multilayer switch, the multilayer switch includes functionality to process packets using both MAC addresses and IP addresses.

In addition to the functionality described above, the switches may include functionality to execute protocols such as link layer discovery protocol (LLDP).

Figure 4A:
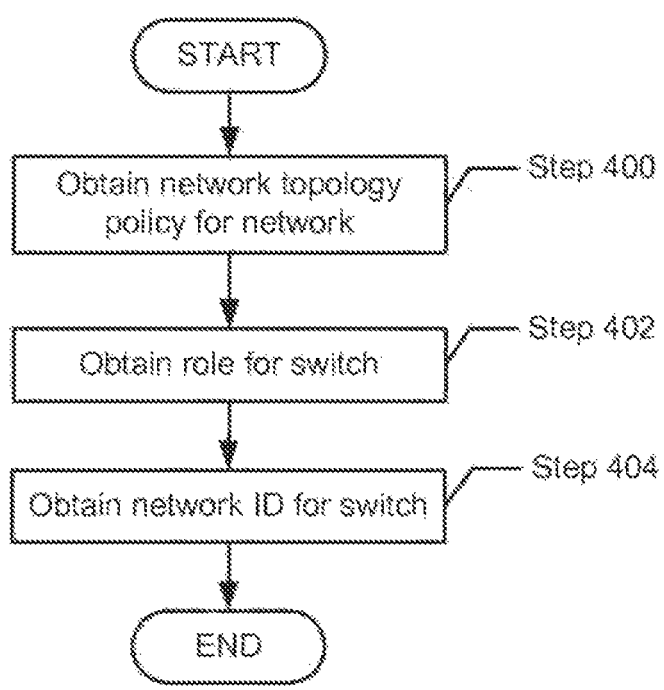
FIG. 4A shows a method for configuring a system in accordance with one or more embodiments of the invention.
Figure 4B:
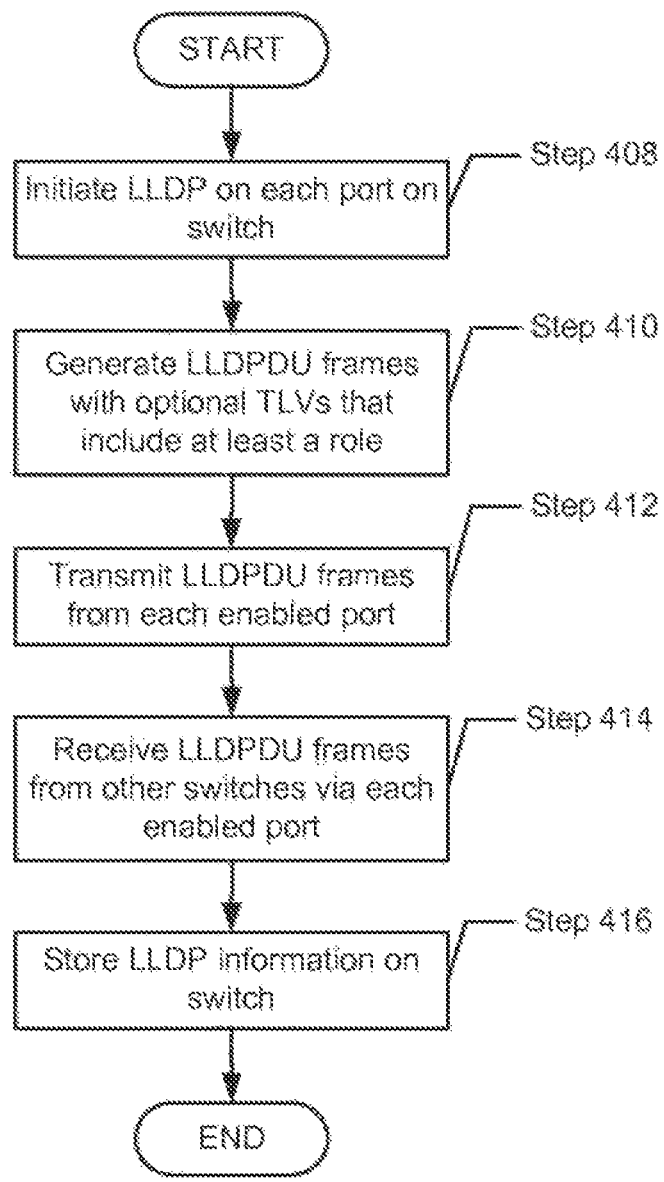
FIG. 4B shows a method for obtaining LLDP information by a switch in the system in accordance with one or more embodiments of the invention.
Figure 4C:
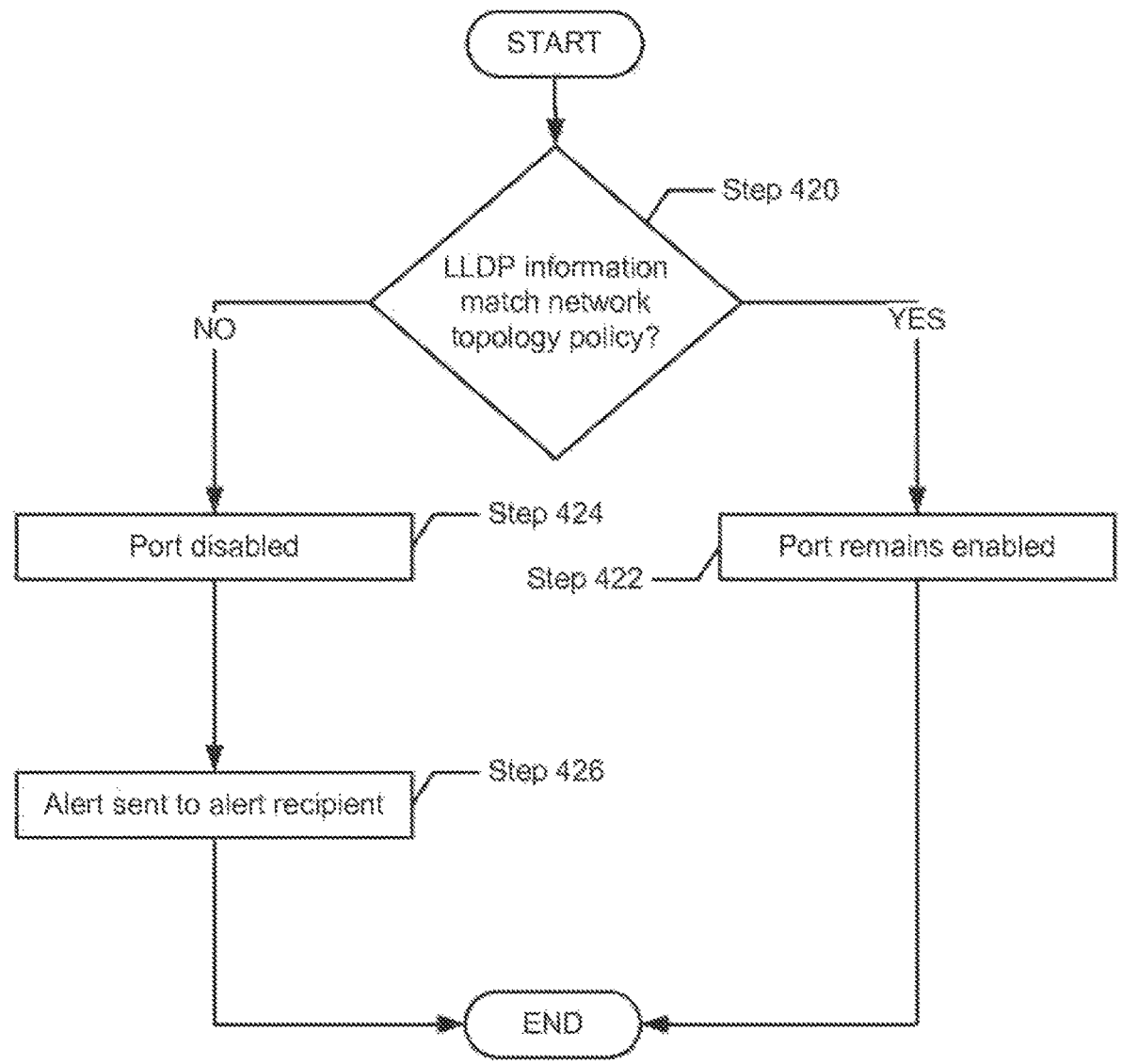
FIG. 4C shows a method for processing LLDP information by a switch in the system in accordance with one or more embodiments of the invention.

In one embodiment of the invention, the persistent storage in the switch may include any non-transitory computer readable medium that includes instructions, which, when executed by one or more processors in the switch, enable the switch to perform the functions described in accordance with one or more embodiments of the invention (see e.g., FIGS. 4A-4C).

In one embodiment of the invention, a host (100A-100C) is a computer system. A computer system may include any type of system (e.g. software and computer hardware) that is configured to generate, send, receive, and/or process requests and replies either locally or over a network using software and computer hardware. The host may include a processor. memory, and one or more physical network interfaces. Examples of types of hosts include, but are not limited to, database servers, application servers, file servers, print servers, and mail servers.

Each host (100A 100C) may be directly connected to at least one switch with the role of a leaf switch (104X-104Z) in switch tier 2 (106A, 106B). In one embodiment of the invention, each host is directly connected to a single switch in switch tier 2 (106A, 106B). In one embodiment of the invention, the switches with the role of a leaf switch (104X-104Z) in switch tier 2 (106A, 106B) are not directly connected to each other. In one embodiment of the invention, each switch with the role of leaf switch is connected to one or more switches in switch tier 1 (110A, 110B). In one embodiment of the invention, the pattern of connections between the switches in switch tier 1 and switch tier 2 is restricted by the network topology policy implemented in the network. The network topology policy is described in more detail in FIG. 2, as well as the examples in FIG. 5A-5C below.

Figure 5A:
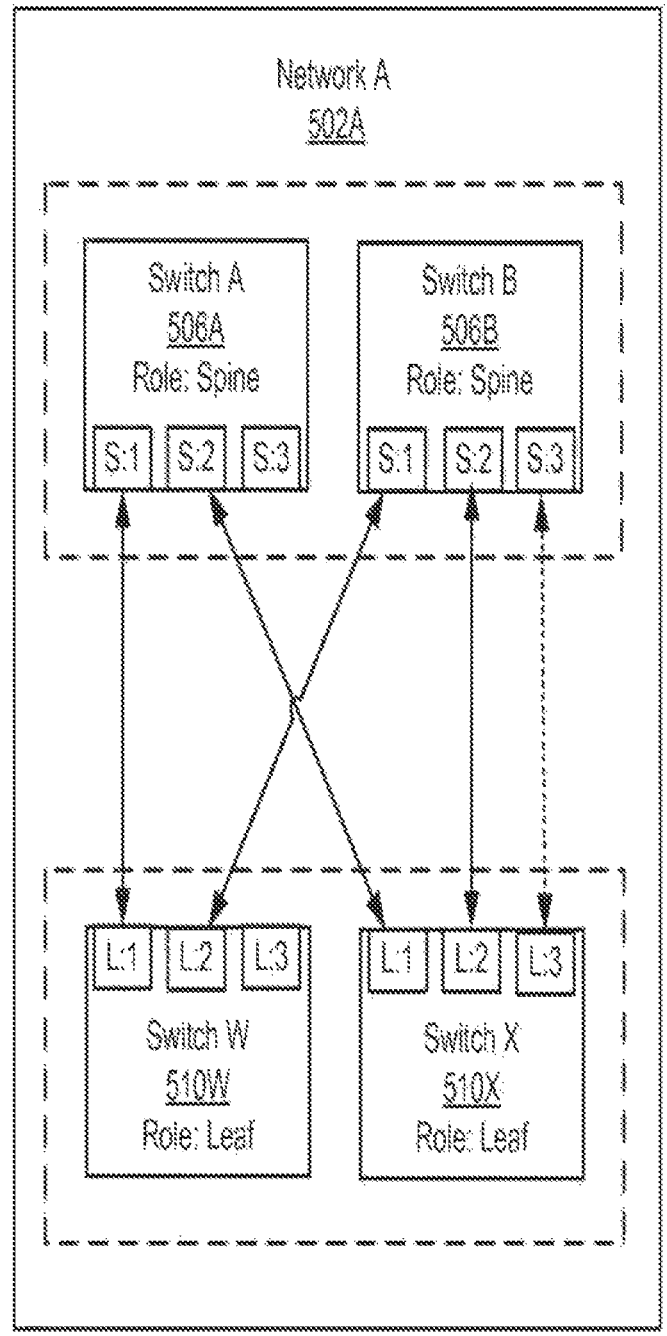
FIGS. 5A-5C show various examples in accordance with one or more embodiments of the invention.
Figure 5B:
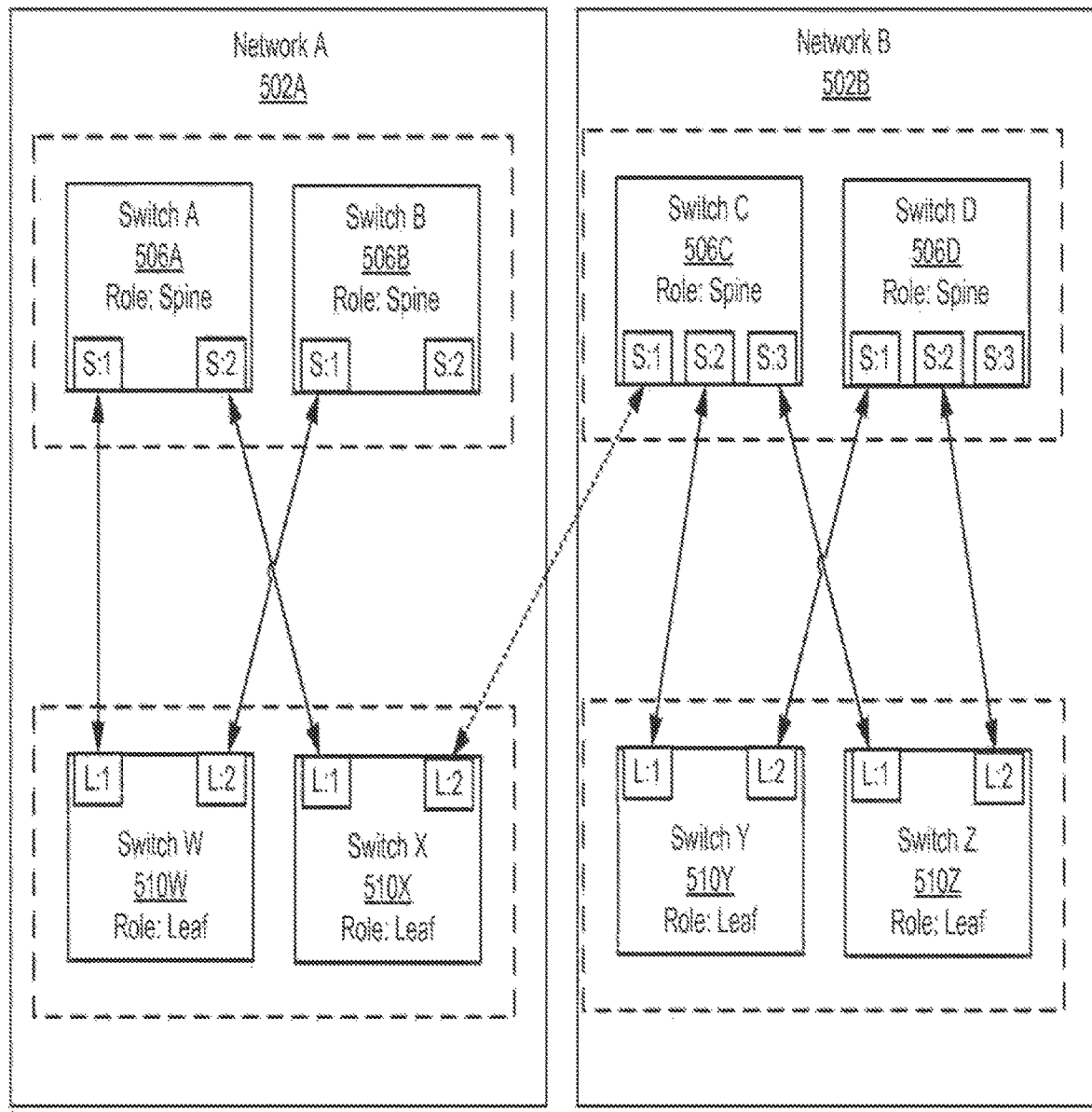
Figure 5C:
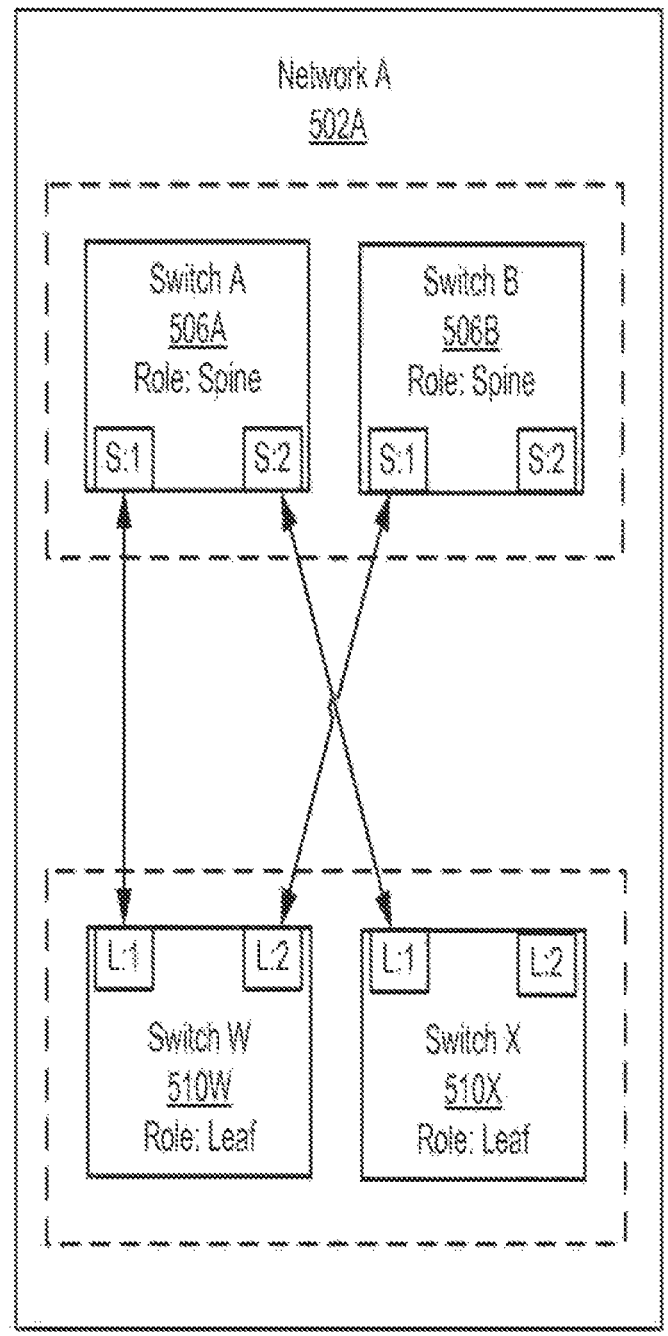

Although the number of switches in switch tier 1 (110A, 110B) and switch tier 2 (106A, 106B) appear equal in FIG. 1, as well as in FIGS. 5A-5C, one skilled in the art will recognize that they may differ in number without departing from the invention. For example, in one embodiment of the invention there are more switches with the role of leaf switch than switches with the role of spine switch in the network infrastructure of a data center.

The invention is not limited to the system shown in FIG. 1.

Figure 2:
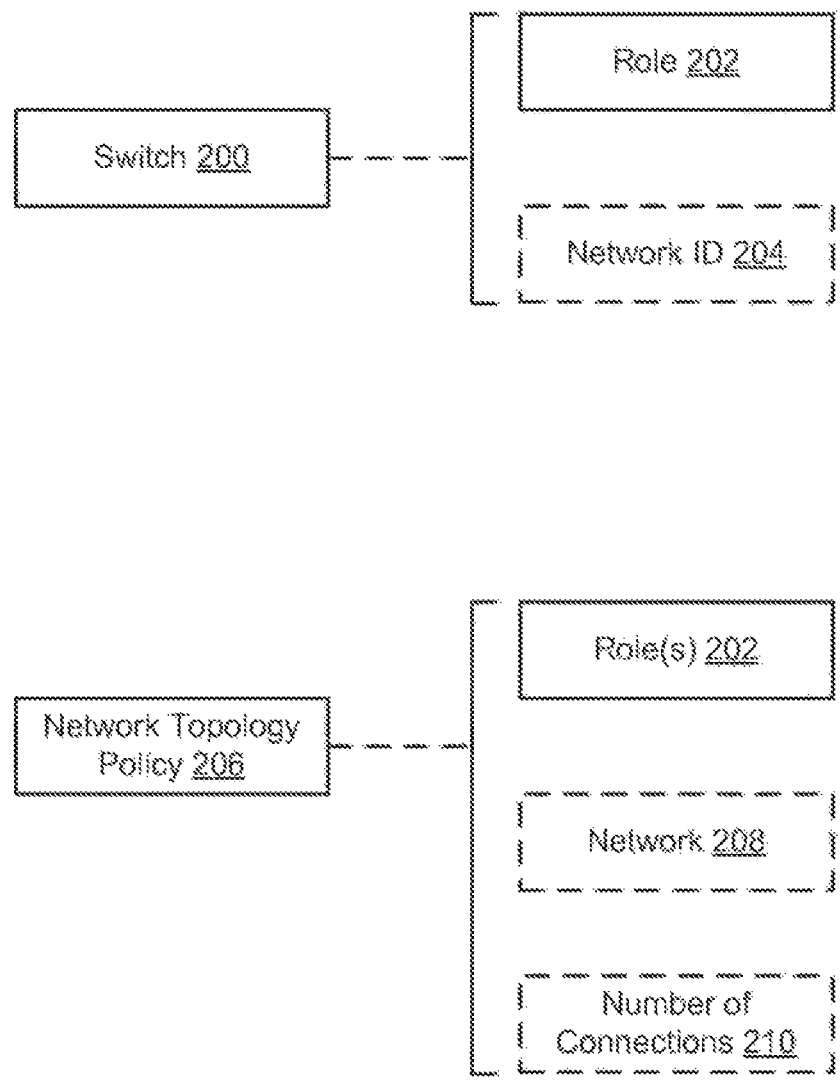
FIG. 2 shows relationships between various components in accordance with one or more embodiments of the invention.

FIG. 2 shows relationships between various components in accordance with one or more embodiments of the invention. In one embodiment of the invention, each switch (200) may be associated with a role (202) and a network ID (204). The role of a switch may be based on the switch tier the switch is located on in the network (208). The switch tiers in a network may include a switch tier of spine switches and a switch tier of leaf switches. For example, a switch in a switch tier of leaf switches is assigned the role of a leaf switch and a switch in a switch tier of spine switches is assigned the role of a spine switch. The role of a switch may be assigned by a user (e.g., a network administrator). The switch may also be preconfigured with a role during the manufacturing of the switch. The role of a switch may be represented as alpha characters, such as leaf for a switch with a role of a leaf switch and spine for a switch with a role of a spine switch. The role may also be represented as alphanumeric characters, such as L11 for the eleventh switch with the role of a leaf switch and S4 for the fourth switch with the role of a spine switch. Additionally, the role may be represented as numeric characters, such as 0001 that is encoded to denote a switch with a role of a leaf switch and 0002 that is encoded to denote a switch with a role of a spine switch. The roles may also be defined using any combination of alpha-numeric characters and/or symbols without departing from the invention. A network includes switches that may be in tiers, such as a leaf tier and spine tier, and hosts that may be in a host tier. Examples of networks include, but are not limited to, a guest network and division network. The network ID identifies a network. The network ID may be represented as characters including alpha, numeric, and/or alphanumeric characters. For example, 005 may represent a guest network of a school where the primary network of the school has a network ID of 001, The role and the network ID may be determined using Link Layer Discovery Protocol (LLDP). The LLDP data unit (LLDPDU) frames generated by the LLDP are customized and may include the role and the network associated with each switch and is described below in FIGS. 3A-3B.

In one embodiment of the invention, the network topology policy (206) defines rules that specify whether a given switch may be connected to another switch, where the rules are based on roles associated with the switches. For example, the network topology policy may specify that a switch with a role of a leaf switch may not be connected to another switch with a role of a leaf switch. Further, the rule may specify that a switch with a given role may have a number of connections (210) to other switches of a given role, where a connection may be from a port of a switch to a port of another switch. For example, the network topology policy may specify that a switch with role a of a leaf switch may be connected to at most three switches with the role of a spine switch. Additionally, the rules may be based on the network associated with the switches. For example, the network topology policy may specify that a switch in the guest network may not be connected to a switch in the primary network. The network topology policy rules may be a combination of the roles and network. For example, the network topology policy may specify that a switch with the role of a leaf switch in the guest network may not connect to a switch with the role of a spine switch in the primary network. The invention is not limited to these examples. The rules of the network topology policy may be affirmative, such as a switch with the role of a leaf switch may connect to another switch of the role of a spine switch. Moreover, the rules of the network topology may be negative, such as a switch with the role of a leaf switch may not connect to another switch with the role of a leaf switch. Further, the rules may be bi-directional. For example, a switch with the role of a leaf switch may connect to another switch of the role of a spine switch also means that a switch with the role of a spine switch may connect to another switch of the role of a leaf switch. One skilled in the art will recognize that the network topology policy may vary based on the implementation of the invention without departing from the invention. For example, the network topology policy may require only the role for a network infrastructure. The network topology policy may be implemented using any combination of the aforementioned embodiments without departing from the invention.

Although the switch (200) is associated with both the role (202) and the network ID (204) in FIG. 2, one skilled in the art will recognize that the switch may only be associated with a role without departing from the invention. For example, in one embodiment of the invention, the network topology policy only limits that a switch in switch tier 2 (104X-104Z) cannot connect to another switch in switch tier 2.

Figure 3A:
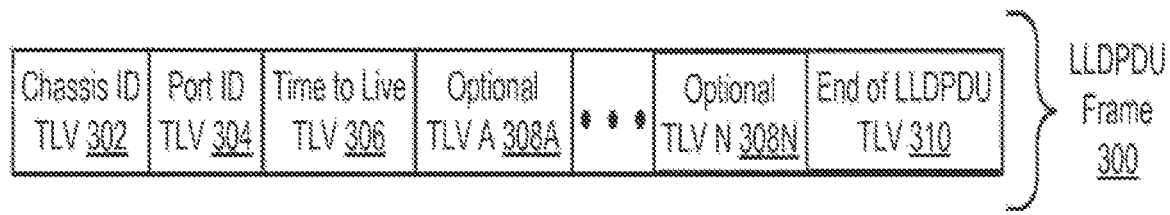
FIGS. 3A-3B show Link Layer Discovery Protocol Data Unit (LLDPDU) frames in accordance in one or more embodiments of the invention.
Figure 3B:
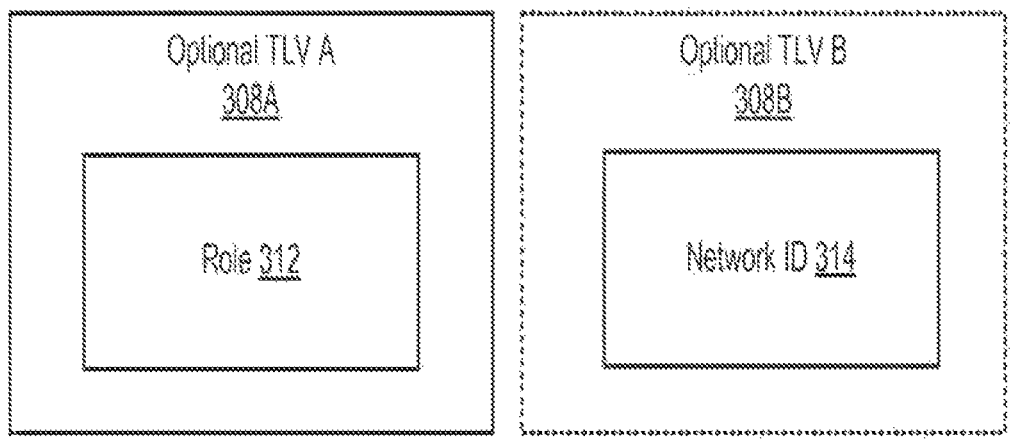

FIGS. 3A-3B show Link Layer Discovery Protocol Data Unit (LLDPDU) frames in accordance in one or more embodiments of the invention. The LLDPDU frame (300) may be generated by LLDP when LLDP is initialized and advertises LLDP information using the LLDPDU frame to neighboring switches. A neighboring switch is a switch that connects to the switch. Each LLDPDU frame includes the following information: (i) a chassis ID TLV (302), (ii) a port ID TLV (304). (iii) a time to live TLV (306), (iv) one or more optional TLVs (308A—308N), and (v) an end of LLDPDU TLV (310). In one embodiment of the invention, the LLDPDU frame is defined in accordance with IEEE 802.1AB. Each of the aforementioned components are described below.

The chassis ID TLV (302) identifies the chassis that includes the IEEE 802 LAN station associated with the switch transmitting the LLDPDU frames. The port ID TLV (304) represents the port of the switch that transmitted the LLDPDU frames. The time to live TLV (306) describes the time in seconds that the information in the LLDPDU frame remains valid. The end of LLDPDU TLV denotes the end of the TLV sequence in the LLDPDU frame. Each optional TLV (308A—308N) may be included before the end of LLDPDU TLV in the LLDPDU frame and are described below in FIG. 3B.

FIG. 3B shows each optional TLV (308A—308B) in accordance with one or more embodiments of the invention. In one embodiment of the invention, the optional TLV (308A, 308B) may include the role assigned to the switch (312) and/or the network ID (314). One skilled in the art will recognize that the number of optional TLVs, in a LLDPDU frame may vary depending on the requirements that the network topology is designed to meet in accordance with the network topology policy (206) described in FIG. 2 without departing from the invention.

The LLDPDU header may include other information/ content without departing from the invention.

FIGS. 4A-4C show flowcharts in accordance with one or more embodiments of the invention. While the various steps in the following flowcharts are presented and described sequentially, one of ordinary skill will appreciate that some or all of the steps may be executed in different orders, may be combined or omitted, and some or all of the steps may be executed in parallel.

FIG. 4A shows a method for configuring a system in accordance with one or more embodiments of the invention. In one embodiment of the invention, the steps in FIG. 4A may be performed in parallel with the steps of FIG. 4B and FIG. 4C.

Turning to FIG. 4A, in Step 400, the network topology policy is obtained describing an intended network topology. The intended network topology occurs when the correct wiring of the network occurs. The intended network topology may be based on the roles of the connected switches (202 from FIG. 2), the network the connecting switches are associated with (208 from FIG. 2) and the number of connections for each switch (210 from FIG. 2).

In Step 402, the switch is associated with a role (202 from FIG. 2). In Step 404, the switch may additionally be associated with the network ID of the network (204 from FIG. 2) in which the switch is located.

FIG. 4A (or portions thereof) may be repeated for each switch in the network and/or data center.

FIG. 4B shows a method for obtaining LLDP information by a switch in the system in accordance with one or more embodiments of the invention. In one embodiment of the invention, the steps in FIG. 4B may be performed in parallel with the steps of FIG. 4A and FIG. 4C.

Turning to FIG. 4B. Steps 408-414 begin and/or are performed in parallel. In Step 408, link layer discovery protocol (LLDP) is initiated on each port of the switch, LLDP is a protocol used by network devices (e.g. switches) for advertising their identity, capabilities, and neighbors. In Step 410, the LLDPDU frames are generated to include optional TLVs (e.g., 308A, 308B in FIG. 3) on each port of the switch. The optional TLV includes at least one of the role of the switch obtained in Step 402, or the network ID of the switch obtained in Step 404.

In Step 412, the LLDPDU frames that include the optional TLVs generated in Step 410 are transmitted on each port of the switch. A switch that is connected to the switch and issues LLDPDU frames is henceforward referred to as a source switch. In Step 414, the LLDPDU frames are received from source switches on each port. The optional TLVs within the received LLDPDU frames may be used to identify the role of each source switch.

In Step 416, the LLDP information is stored on the switch. The LLDP information includes information from the received LLDPDU frames obtained in Step 414, including at least the source of the LLDPDU frame (i.e., source switch), the port on the switch that received the LLDPDU frame and the optional. TLVs. The switch may include functionality to store the LLDP information, as one or more entries, in a management information base (MIB) located on the switch.

FIG. 4B (or portions thereof) may be repeated for each switch in the network and/or data center.

FIG. 4C shows a method for processing LLDP information by a switch in the system in accordance with one or more embodiments of the invention. In one embodiment of the invention, the steps in FIG. 4C may be performed in parallel with the steps of FIG. 4A and FIG. 4B.

Turning to FIG. 4C, in Step 420, LLDP information received from a source switch is obtained and a determination is made about whether the role of the switch and the role of the source switch satisfy the network topology policy obtained in Step 400. In other embodiments of the invention, the network of the switch and the network of the source switch may determine whether the switch adheres to the network topology policy obtained in Step 400. Further, the role and network of the switch and the role and network of the source switch may also determine whether the switch adheres to the network topology policy obtained in Step 400. In other embodiments of the invention, the number of connections of the switch may be used in addition to the role and network to determine whether the switch adheres to the network topology policy obtained in Step 400. Step 400 may be repeated for each port on the switch that receives LLDPDU frames. LLDP information may be aggregated from each port on the switch that receives LLDPDU frames when the network topology policy includes rules based on the number of connections.

Continuing with the discussion of FIG. 4C, if the LLDP information satisfies the network topology policy by adhering to the rules of the network topology policy, then the process proceeds to Step 422; otherwise, the process proceeds to Step 424. In the event that LLDP information of the switch satisfies the network topology policy (as determined in Step 420). the process proceeds to Step 422. Said another way, the network topology policy confirms that the wiring of the switch is the intended network topology. In Step 422, the port connecting the switch and the source switch remains enabled. In the event that LLDP information of the switch does not satisfy the network topology policy (as determined in Step 420), the process proceeds to Step 424. In Step 424, the LLDP information may then be used to disable the port connecting the switch and the source switch. More specifically, the optional TLVs within the LLDPDU (or portions thereof, e.g., the role of the source switch) are used to determine if the port should be disabled.

In Step 426, the LLDP information is used to send an alert, where the alert may be a notification that a connection between a port on the switch and a port on the source switch is an improper or missing connection based on the network topology policy. The alert may also flag the port on the switch that does not adhere to the network topology policy. Further, the alert may include any ports on the switch that have been disabled. When the network topology policy includes the number of connections, the alert may include the current connections to help identify any missing connections. The alert is sent to an alert recipient who manages the network topology (e.g., network administrator, system administrator, IT Operations). For example, the alert may be conveyed in an email to notify the network administrator that a switch with a role of a leaf switch is connected to the source switch with the role of a leaf switch via port 1 on the switch and that port 1 has been disabled.

In one embodiment of the invention, FIG. 4C is performed for each switch independently.

While the invention has been described with respect to LLDPDUs, embodiments of the invention may be implemented using other discovery protocols (as described above). In such cases, the information is communicated in a format that may be generally referred to as a Discovery Protocol Data Unit (DPDU), where a DPDU includes the information necessary to implemented one or more embodiments of the invention (e.g., role, network ID, etc.). The DPDU is not limited to the structure or format of the LLDPDU shown in FIGS. 3A-3B; rather, the DPDU conforms to the particular specifications of the discovery protocol that is used to implement one or more embodiments of the invention. For example, when the invention is implemented using LLDP, the DPDU is a LLDPDU; however, when the invention is implemented using Cisco Discovery Protocol the DPDU is a CDP announcement. The DPDUs are not limited to the implementations of LLDPDUs and CDP announcements.

FIGS. 5A-5C show various examples in accordance with one or more embodiments of the invention. The following examples are for explanatory purposes only and not intended to limit the scope of the invention.

Turning to FIG. 5A, consider the scenario in which there is a data center with a network (502A) that includes four switches. Though not shown in FIG. 5A, each of the switches may be connected to other network devices (not shown) and/or other hosts (not shown). A network topology policy specifies that (i) a leaf switch can only connect to a spine switch or a host; (ii) a leaf switch can connect to another leaf switch in a MLAG domain; (iii) a leaf switch has only one connection to each of the two spine switches; (iv) a leaf switch cannot connect to a spine switch in a different network. Switch A (506A) has a role of a spine switch. Port S:1 on switch A transmits LLDP information to port L:1 on switch W (510W). Port S:2 on switch A transmits LLDP information to port L:1 on switch X (510X). Port S:1 on switch A receives LLDP information from port L:1 on switch W and extracts the source of the LLDP information (switch W) and the role from the optional TLV in the LLDPDU frames (leaf). Port S:2 on switch A receives LLDP information from port L:1 on switch X and extracts the source of the LLDP information (switch X) and the role from the optional TLV in the LLDPDU frames (leaf). Switch A adheres to the rules (i) to (iv) in the network topology policy.

Continuing with the example, Switch B (506B) has a role of a spine switch. Port S:1 on switch B transmits LLDP information to port L:2 on switch W (510W). Port S:2 on switch B transmits LLDP information to port L:2 on switch X (510X). Port S:3 on switch B transmits LLDP information to port L:3 on switch X (510X), Port S:1 on switch B receives LLDP information from port L:2 on switch W and extracts the source of the LLDP information (switch W) and the role from the optional TLV in the LLDPDU frames (leaf). Port S:2 on switch B receives LLDP information from port L:2 on switch X and extracts the source of the LLDP information (switch X) and the role from the optional TLV in the LLDPDU frames (leaf). Port S:3 on switch B receives LLDP information from port L:3 on switch X and extracts the source of the LLDP information (switch X) and the role from the optional TLV in the LLDPDU frames (leaf). Switch B then sends an alert in an email to the network administrator that there are two connections with switch X through ports S:2 and S:3 that have a role of leaf, violating (iii) of the network topology policy.

Continuing with the example. Switch W has a role of a leaf switch. Port L:1 on switch W transmits LLDP information to port S:1 on switch A. Port L:2 on switch W transmits LLDP information to port S:1 on switch B. Port L:1 on switch W receives LLDP information from port. S:1 on switch A and extracts the source of the LLDP information (switch A) and the role from the optional TLV in the LLDPDU frames (spine). Port L:2 on switch W receives LLDP information from port S:1 on switch B and extracts the source of the LLDP information (switch B) and the role from the optional TLV in the LLDPDU frames (spine). Switch W adheres to the rules (i) to (iv) in the network topology policy.

Continuing with the example, Switch X has a role of a leaf switch. Port L:1 on switch X transmits LLDP information to port S:2 on switch A. Port L:2 on switch X transmits LLDP information to port S:2 on switch B. Port L:3 on switch X transmits LLDP information to port S:3 on switch B. Port L:1 on switch X receives LLDP information from port S:2 on switch A and extracts the source of the LLDP information (switch A) and the role from the optional TLV in the LLDPDU frames (spine). Port L:2 on switch X receives LLDP information from port S:2 on switch B and extracts the source of the LLDP information (switch B) and the role from the optional TLV in the LLDPDU frames (spine). Port L:3 on switch X receives LLDP information from port S:3 on switch B and extracts the source of the LLDP information (switch B) and the role from the optional TLV in the LLDPDU frames (spine). Switch X then sends an alert in an email to the network administrator that there are two connections with switch B through ports L:2 and L:3 that have a role of spine, violating (iii) of the network topology policy. The network administrator receives the email alert from switch B and the email alert from switch X and disables the improper connection from port L:3 on switch X to port S:3 on switch B (represented in FIG. 5A by a dotted line).

Referring to FIG. 5B, consider the scenario in which there is a data center with two networks (502A, 502B) that each includes four switches. In network A (502A), two of the switches are assigned the role of a spine switch (506A. 506B) and two of the switches are assigned the role of a leaf switch (510W, 510X). The network ID of network A is N01. In network B (502B), two of the switches are assigned the role of a spine switch (506C, 506D) and two of the switches are assigned the role of a leaf switch (510Y. 510Z). The network ID of network B is N02. Though not shown in FIG. 5B, each of the switches may be connected to other network devices (not shown) and/or other hosts (not shown). The network topology policy specified in FIG. 5A applies to the networks in FIG. 5B. In particular, consider port S:1 on switch C (506C) in network B (502B) and port L:2 on switch X (510X) in network A. Switch C has a role of a spine switch. Port S:1 on switch C transmits LLDP information to port L:2 on switch X. Port S:1 on switch C receives LLDP information from port L:2 on switch X and extracts the source of the LLDP information (switch X), the role (leaf) and the network ID (N01) from the optional TLVs in the LLDPDU frames. Switch C then sends an alert in an email to the network administrator that there is a connection from the network with network ID N02 to the network with network ID N01 from port S:1, violating (iv) of the network topology policy. Switch X has a role of a leaf switch, Port L:2 on switch X transmits LLDP information to port S:1 on switch C. Port L:2 on switch X receives LLDP information from port S:1 on switch C and extracts the source of the LLDP information (switch C), the role (spine) and the network ID (N02) from the optional TLVs in the LLDPDU frames. Switch X then sends an alert in an email to the network administrator that there is a connection from the network with network ID N01 to the network with network ID N02 from port L:2, violating (iv) of the network topology policy. The network administrator receives the email alert from switch C and the email alert from switch X and disables the improper connection from port L:2 on switch X to port S:1 on switch C (represented in FIG. 5B by a dotted line).

Referring to FIG. 5C, consider the scenario in which there is a data center with a network (502A) that includes four switches. Two of the switches are assigned the role of a spine switch (506A, 506B). Two of the switches are assigned the role of a leaf switch (510W, 510X). Though not shown in FIG. 5C, each of the switches may be connected to other network devices (not shown) and/or other hosts (not shown). The network topology policy specified in FIG. 5A applies to the network in FIG. 5C. In particular, consider switch B (506B) and switch X (510X). Switch B has a role of a spine switch. Port S:1 on switch B transmits LLDP information to port L:2 on switch W. Port S:1 on switch B receives LLDP information from port L:2 on switch W and extracts the source of the LLDP information (switch W) and the role from the optional TLVs in the LLDPDU frames (leaf). Port S:2 on switch B does not connect to another port and does not transmit LLDP information or receive LLDP information. Switch B does not send an alert in an email to the network administrator as the policy does not include the number of leaf switches in the network. Switch X has a role of a leaf switch. Port L:1 on switch X transmits LLDP information to port S:2 on switch A. Port L:1 on switch X receives LLDP information from port S:2 on switch A and extracts the source of the LLDP information (switch A) and the role from the optional TLVs in the LLDPDU frames (spine). Port L:2 on switch X does not connect to another port and does not transmit LLDP information. Port L:2 on switch X does not connect to another port and does not receive LLDP information, Switch X then sends an alert in an email to the network administrator that there is one connection to a switch with a role of spine (switch A), but a connection is missing to a second switch with a role of spine, violating (iii) of the network topology policy. The network administrator receives the email alert from switch X. Because the alert includes the connection to switch A, the network administrator verifies the connections of switch B and enables the missing connection between port L:2 on switch X to port S:2 on switch B.

Embodiments of the invention enable efficient enforcement of network topology with minimal input from an alert recipient. The network topology is enforced using a network topology policy and neighbor information, including the role of the switch. Embodiments of the invention enable the association of the role to a switch in an optional TLV in the LLDPDU frames transmitted to neighboring switches to convey the role. The switch receives LLDPDU frames from source switches, extracts the neighbor information, including the role to verify that the switch's connections to the source switches adhere to the network topology policy. As a result, erroneous connections between switches may be detected automatically using one or more embodiments of the invention.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for network topology enforcement, the method comprising:
   obtaining, by a first network device associated with a first network, a network topology policy including a rule indicating that network devices associated with the first network cannot transmit packets to and receive packets from network devices associated with a second network different from the first network;
   generating, by the first network device, a first discovery protocol data unit (DPDU) comprising at least one role attribute comprising a network identifier (ID) for identifying the first network, wherein each network device associated with the first network is configured to use the network ID; and
   transmitting the first DPDU to at least one operatively connected device.

2. The method of claim 1, wherein the at least one role attribute further comprises a device role.

3. The method of claim 1, wherein the at least one role attribute further comprises a port role.

4. The method of claim 1, wherein the at least one role attribute further comprises geography information.

5. The method of claim 1, wherein the at least one role attribute further comprises group membership information.

6. The method of claim 1, wherein the first DPDU comprises a frame that includes a set of type-length-value (TLV) fields, wherein generating the first DPDU comprises storing the at least one role attribute in the set of TL V fields of the DPDU frame.

7. The method of claim 1, wherein the at least one role attribute further comprises a data center identifier.

8. The method of claim 1, wherein the at least one role attribute further comprises network topology model information.

9. The method of claim 1, wherein the at least one role attribute further comprises a device operating state.

10. The method of claim 9, wherein the device operating state comprises at least one selected from a group consisting of a maintenance mode status, a device multi-chassis link aggregation (MLAG) status, and a device boot status.

11. A method for network topology enforcement, the method comprising:
    receiving, by a first network device, a first discovery protocol data unit (DPDU) comprising at least one role attribute comprising a first network identifier (ID) for identifying a first network in which a second network device connected to the first network device is included, wherein each network device included in the network is configured to use the network ID;
    performing an evaluation of the received at least one role attribute using a local role attribute comprising a second network ID for identifying a second network in which the first network device is included, wherein performing the evaluation comprises determining whether the first network ID identifying the first network and the second network ID identifying the second network are different;
    based on the determination that the first network ID and the second network ID are different, determining that the first network device should not transmit packets to and receive packets from the second network device; and
    performing a network management action based on the determination that the first network device should not transmit packets to and receive packets from the second network device.

12. The method of claim 11, wherein the at least one role attribute further comprises a device role of the second network device, the method further comprising using a local role attribute comprising a device role of the first network device and comparing with the device role of the second network device to determine whether a connection between the first network device and the second network device is correct, wherein determining that the first network device should not transmit packets to and receive packets from the second network device is further based on determining the connection is incorrect.

13. The method of claim 12, wherein the device role of the first network device is a leaf role and the device role of the second network device is a spine role.

14. The method of claim 11, wherein the at least one role attribute further comprises a port role of the second network device, the method further comprising using a local role attribute comprising a port role of the first network device and comparing with the port role of the second network device to determine whether a connection between the first network device and the second network device is correct, wherein determining that the first network device should not transmit packets to and receive packets from the second network device is further based on determining the connection is incorrect.

15. The method of claim 11, wherein the network management action is a first network management action, and wherein the at least one role attribute further comprises a number of connections that the first network device has with other network devices, the method further comprising:

determining, based on the number of connections that the first network device has with other network devices, whether connections between the first network device and the other network device are correct; and upon determining the connections are incorrect, performing a second network management action.

16. The method of claim 11, wherein the at least one local role attribute and the first DPDU both further comprises at least one of: a device role, a port role, geography information, group membership information, a data center identifier, network topology model information, and a device operating state, the method further comprising determining, based on the at least one local role attribute and the first DPDU, whether a connection between the first network device and the second network devices is correct, wherein determining that the first network device should not transmit packets to and receive packets from the second network device is further based on determining the connection is incorrect.

17. The method of claim 11, wherein the network management action comprises at least one of: performing a logging action, generating an alert, changing a status of an interface of the first network device, and modifying packet forwarding characteristics of the first network device.

18. The method of claim 11, wherein the evaluation comprises making a determination, by the first network device and using the at least one role attribute and the local attribute, that a data center identifier matches.

19. The method of claim 11, wherein the evaluation comprises making a determination, by the first network device and using the at least one role attribute and the local attribute, that a quantity of connected interfaces is correct.

20. The method of claim 11, wherein the evaluation comprises making a determination, by the first network device and using the at least one role attribute and the local attribute, that the first network device is a leaf device and that a device from which the at least one role attribute is received is a spine device.

21. A network device associated with a first network, the network device comprising:

one or more processors; and a non-transitory computer readable medium having stored thereon instructions that, when executed by the one or more processors, cause the one or more processors to:

obtain a network topology policy including a rule indicating that network devices associated with the first network cannot transmit packets to and receive packets from network devices associated with a second network different from the first network;

generate a discovery protocol data unit (DPDU) comprising a network identifier (ID) for identifying the first network, each network device associated with the first network being configured to use the network ID; and transmit the DPDU to at least one operatively connected device.

* * * * *